United States Patent
Tian et al.

(10) Patent No.: US 6,465,959 B1
(45) Date of Patent: Oct. 15, 2002

(54) METHOD AND APPARATUS FOR IMPROVED ELECTRODELESS LAMP SCREEN

(75) Inventors: Yonglai Tian, Fairfax; Douglas A. Kirkpatrick, Great Falls, both of VA (US); Bradley D. Craig, Cottage Grove, MN (US); John F. Rasmussen, North Potomac, MD (US); Michael G. Ury, Great Barrington, MA (US)

(73) Assignee: Fusion Lighting, Inc., Rockville, MD (US)

( * ) Notice: Subject to any disclaimer, the term of this patent is extended or adjusted under 35 U.S.C. 154(b) by 0 days.

(21) Appl. No.: 09/380,506

(22) PCT Filed: Jun. 3, 1998

(86) PCT No.: PCT/US98/10934
§ 371 (c)(1),
(2), (4) Date: Sep. 3, 1999

(87) PCT Pub. No.: WO98/56213
PCT Pub. Date: Dec. 10, 1998

Related U.S. Application Data

(60) Provisional application No. 60/048,599, filed on Jun. 4, 1997, and provisional application No. 60/055,488, filed on Aug. 12, 1997.

(51) Int. Cl.[7] ............................................. H01J 65/04
(52) U.S. Cl. .................. 315/39; 315/248; 313/238; 313/110
(58) Field of Search ................... 315/39, 248; 313/238, 313/110

(56) References Cited

U.S. PATENT DOCUMENTS

| 4,245,179 A | | 1/1981 | Buhrer ....................... 315/248 |
| 4,427,923 A | | 1/1984 | Proud et al. ................. 315/248 |
| 4,673,846 A | * | 6/1987 | Yashizawa et al. ....... 315/39 X |
| 4,695,694 A | * | 9/1987 | Hill et al. ................. 315/39 X |

FOREIGN PATENT DOCUMENTS

| JP | 235325 | * 11/1985 | ................... 315/39 |

* cited by examiner

Primary Examiner—Benny T. Lee
(74) Attorney, Agent, or Firm—Paul E. Steiner

(57) ABSTRACT

A screen (49) including mesh portions (47 and 48) for a discharge lamp (46) bears a protective coating which inhibits degradation of the screen under lamp operating conditions. The coating does not absorb microwave energy, is transparent or reflective to visible light, and is capable of protecting the screen for at least several thousand hours of operation without substantial oxidation or tarnishing of the screen. The coating remains on the screen at screen temperatures above about 300 degrees C, and the coating does not significantly crack as the screen heats and cools. The coating may include, for example, a solgel deposited single phase or two phase glass.

29 Claims, 10 Drawing Sheets

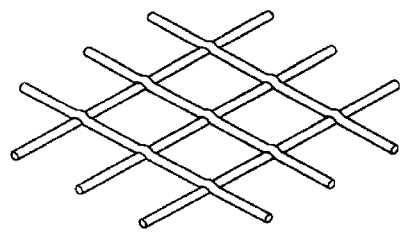
PRIOR ART FIG.1
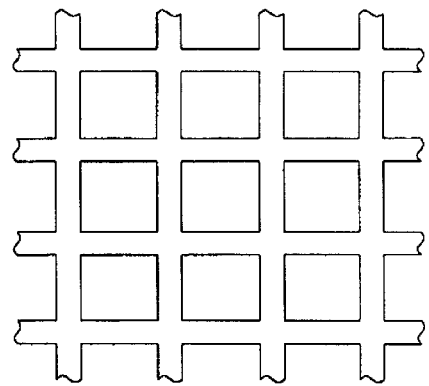
FIG.2 PRIOR ART
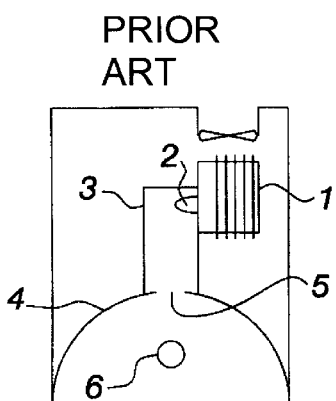
PRIOR ART FIG.3
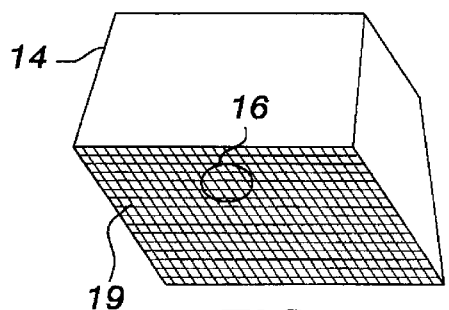
FIG.4 PRIOR ART
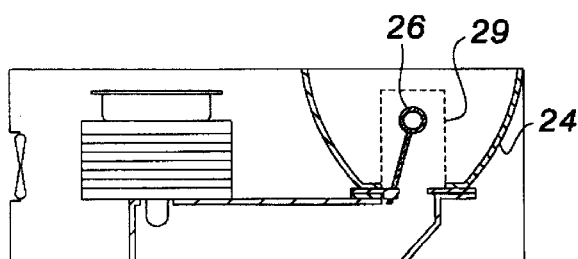
PRIOR ART FIG.5
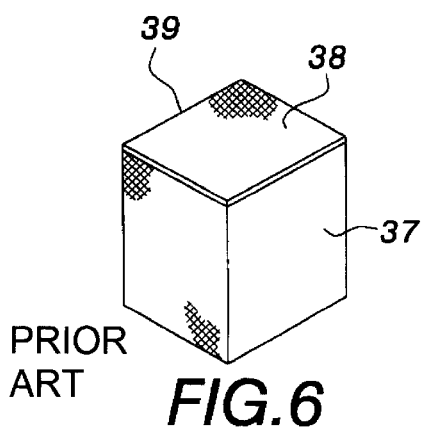
PRIOR ART FIG.6

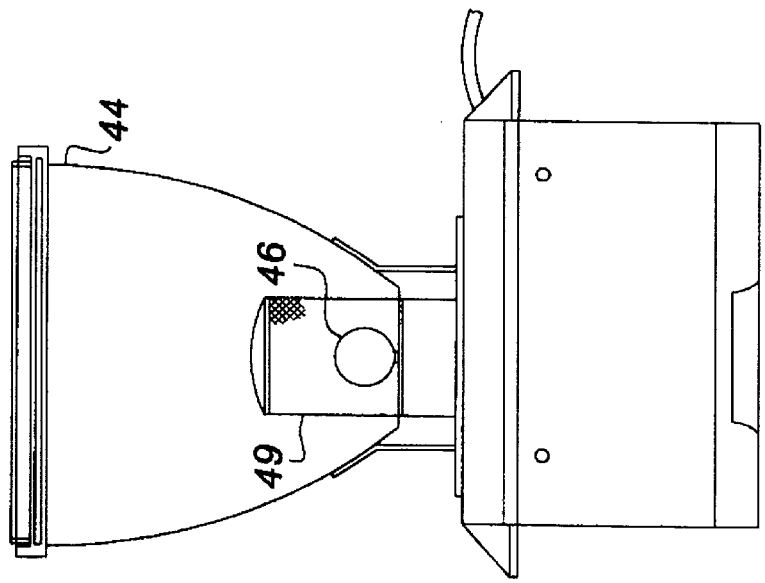
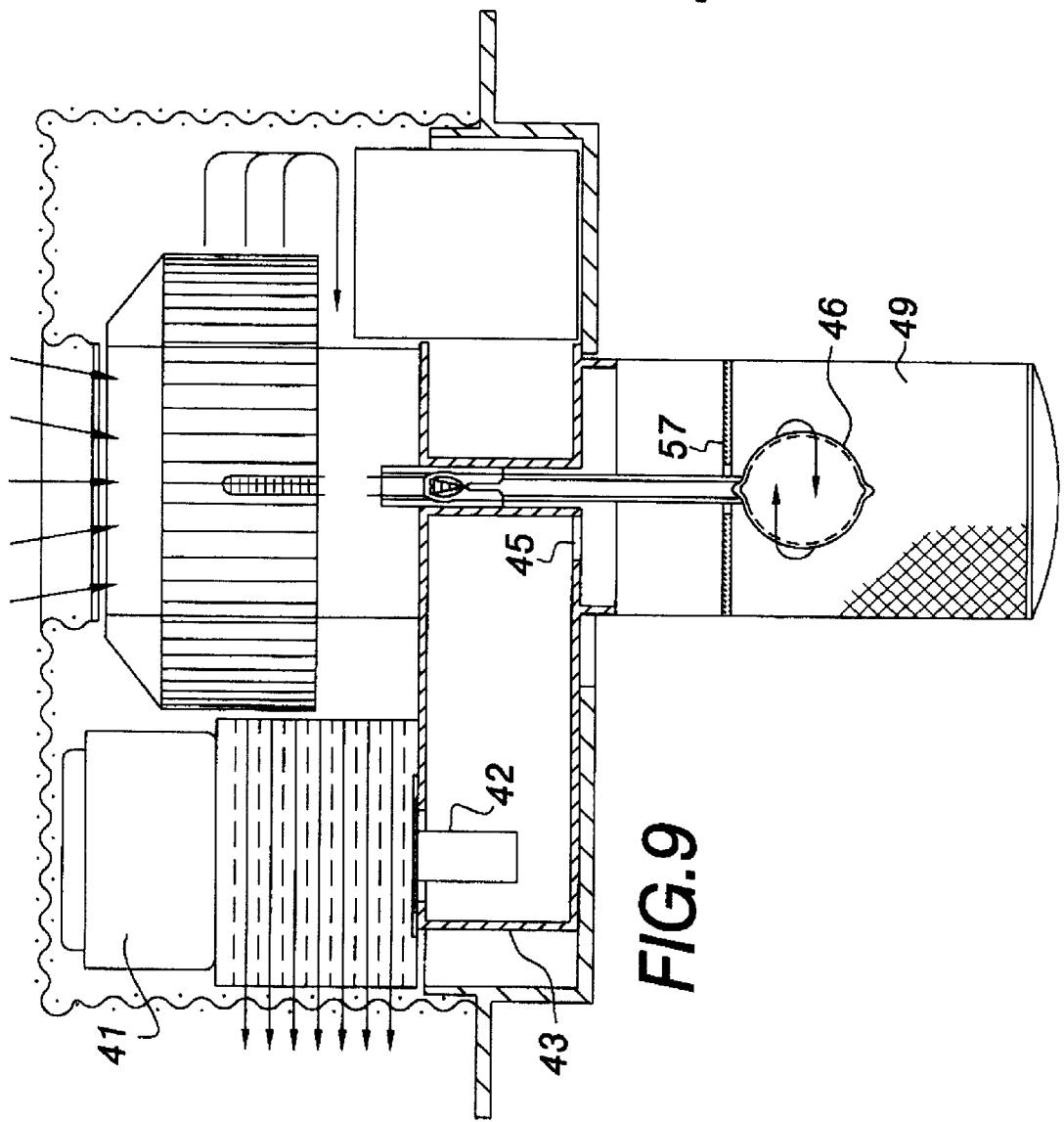

METHOD AND APPARATUS FOR IMPROVED ELECTRODELESS LAMP SCREEN

CROSS REFERENCE TO RELATED APPLICATIONS

This application is based on and claims the benefit of priority of U.S. provisional application No. 60/048,599, filed Jun. 4, 1997, and U.S. provisional application No. 60/055,488, filed Aug. 12, 1997.

BACKGROUND

The present invention pertains to screens used to form microwave cavities associated with electrodeless lamps. Examples of such screens are disclosed in PCT Publication Nos. WO 97/27617 and WO 97/27618; U.S. Pat. No. 4,673,846; and U.S. Pat. No. 5,397,966, each of which is incorporated by reference herein. Typically, the screen or mesh is made of electrically conductive material or metal, commonly stainless steel foil having a thickness of about 0.005 inches or less. The mesh size is typically selected to optimize various factors including RF shielding, light transmission, electrical conductivity, and thickness for structural strength.

The mesh material may be formed from overlapping wires, as shown in FIG. 1, or may be etched, as shown in FIG. 2. An etched mesh has the advantage of lower contact resistance at the mesh intersections. Also, a mesh of overlapping wires may be plated, for example, with an electrically conductive metal, such as stainless steel, so that the mesh intersections become integrally jointed.

Typically, the mesh is formed to provide a screen portion of a microwave cavity. For example, FIG. 3 shows an electrodeless lamp which includes a magnetron 1 which generates microwave energy. The microwave energy is radiated by an antenna 2 into a waveguide 3. The waveguide 3 directs the microwave energy through an opening 5 to a cavity, defined by a reflector 4 and a screen 9, where the microwave energy excites the material inside a bulb 6. In FIG. 3, the screen 9 is flat and has a circular shape with a diameter corresponding to the diameter of the opening of the reflector 4. Other flat screens may be formed with any number of possible shapes. For example, FIG. 4 shows a screen 19 which is flat and has a square shape which corresponds to a square opening of a reflector 14 which houses a bulb 16.

In FIGS. 3 and 4, the walls of the respective reflectors 4, 14 substantially define the microwave cavity and the corresponding screens 9, 19 have a two dimensional (i.e. flat) shape. Other configurations are also possible where the screen has a three-dimensional shape and the screen itself substantially defines the microwave cavity For example, FIG. 5 shows a configuration where the screen 29 surrounds the bulb 26 and the reflector 24 is separate from the cavity defined by the screen 29. In another example, as shown in FIG. 6, the screen 39 may be box-shaped with walls 37 and a top 38. Other three-dimensional shapes are also possible.

A problem with prior art screens is that the screen material degrades during operation. For example, various screen materials may oxidize or tarnish over the life of the lamp. The degradation causes various undesirable effects including, for example, reduced light output.

SUMMARY

The present invention is directed to a screen for an electrodeless lamp which includes a coating on the screen. The screen includes a conductive mesh which bears a protective coating for inhibiting degradation of the screen. For example, the coating protects the screen from oxidizing and/or tarnishing. An exemplary coating may comprise a glass coating with a controlled set of material properties to provide the above-described protection under lamp operating conditions for at least about 1000 hours and without substantial cracking as the screen heats and cools.

Preferably, the coating includes a diffusion barrier to substantially reduce the diffusion of oxygen and/or sulfur onto the screen material. More preferably, the diffusion barrier also substantially reduces the sublimation of the screen material. The diffusion barrier includes, for example, one or more of the following materials: silica, single phase glass, two phase glass, and aluminum. The diffusion barrier is effective to inhibit degradation and the diffusion barrier does not substantially crack at a screen temperature of greater than about 300° C.

The protection provided by the coating extends the useful life of the screen and, in some circumstances, the reflector. The coating may be substantially transparent or diffusely reflective or specularly reflective. The coating may be applied, for example, through a sol-gel process. For example, the coating may be applied by preparing a solution which includes an organic precursor of silica, applying the solution to at least a portion of the screen, drying the applied solution, thereby leaving a deposit on the screen which includes silica, and firing the screen at a temperature sufficient to convert the deposit to a glass. The applying step includes spraying the solution on the screen or dipping the screen in the solution and withdrawing the screen, preferably at a uniform rate, the rate being determined to provide a desired thickness of the coating.

The step of preparing the solution includes, for example, mixing a first solution of magnesium nitrate (3% to 16% by weight), aluminum nitrate (3% to 8% by weight), MeOH (16% to 28% by weight), and TEOS (7% to 24% by weight) with a second solution of MEK (35% to 40% by weight), phosphoric acid (4% to 10% by weight), and MeOH (2% to 4% by weight).

BRIEF DESCRIPTION OF THE DRAWINGS

The invention will be better understood with reference to the drawings, wherein:

FIG. 1 is a fragmented, perspective view of a prior art mesh formed from overlapping wires;

FIG. 2 is a fragmented, schematic view of an etched prior art mesh;

FIG. 3 is a schematic view of an electrodeless lamp which uses a flat, round prior art screen;

FIG. 4 is a perspective view of an reflector with a flat, square prior art screen;

FIG. 5 is a schematic view of an electrodeless lamp which uses a three-dimensional prior art screen;

FIG. 6 is a perspective view of a box-shaped prior art screen which may be used in the electrodeless lamp shown in FIG. 5;

FIG. 9 is a schematic view of an electrodeless lamp which uses the preferred screen according to the invention;

FIG. 10 is a schematic view of an electrodeless lamp, including a reflector, which uses the preferred screen according to the invention;

DESCRIPTION

Stainless steel is a relatively resistive material which, when used as a material in a screen for a microwave cavity, creates losses due to ohmic heating from the current induced in the screen. In addition, screens of the type described above typically block from five to eighteen percent of the emitted light by virtue of the opaque area of the mesh. Moreover, if the screen absorbs a significant amount of the emitted light, the temperature of the screen material rapidly elevates. Most metals show- a marked increase in electrical resistance as the temperature increases, typically a factor of three increase in resistance from room temperature to 500° C. Thus, the electrical energy losses can be substantial at lamp operating temperatures.

As the temperature climbs, metal degradation rates (e.g. formation of oxides, sulfides, sulfates, and nitrates) also increase. The oxides may also decompose and liberate metal particles, and other problems can occur. For example, in a high power lamp, the screen absorbs even more energy and, in the case of stainless steel, its surface goes from a mirror finish to a brownish-gray matte finish. In addition, if metal material are liberated from the screen due to decomposition of the oxides formed, the material may redeposit on the reflector surrounding the screen and can reduce the reflectivity of the reflector. A ten to fifteen percent (10–20%) reduction in light output has been observed due to degraded screens, and an additional thirty percent (30%) reduction in system light output has been observed due in part to particles of the screen material depositing on the reflector.

Some of the problems noted above were addressed in a high power sulfur lamp, the Solar 1000®, made by Fusion Lighting, Inc., assignee of the present application. This lamp employed a new screen technology, including:

1. a silver plated screen to increase the conductivity of the material and thereby reduce electrical losses;
2. a relatively- highly reflective surface to scatter the light which would be absorbed by a stainless steel screen (most of the photons escape from the enclosure and add to the efficiency of the system); and
3. the use of the forced air, which cools the bulb, to create turbulence around the-screen which also cools the screen, thereby lowering its temperature and the rate at which the material might oxidize or decompose.

These improvements in screen technology are not evident to the casual observer but are present in some versions of the Solar 1000® lamp.

Figure 7:
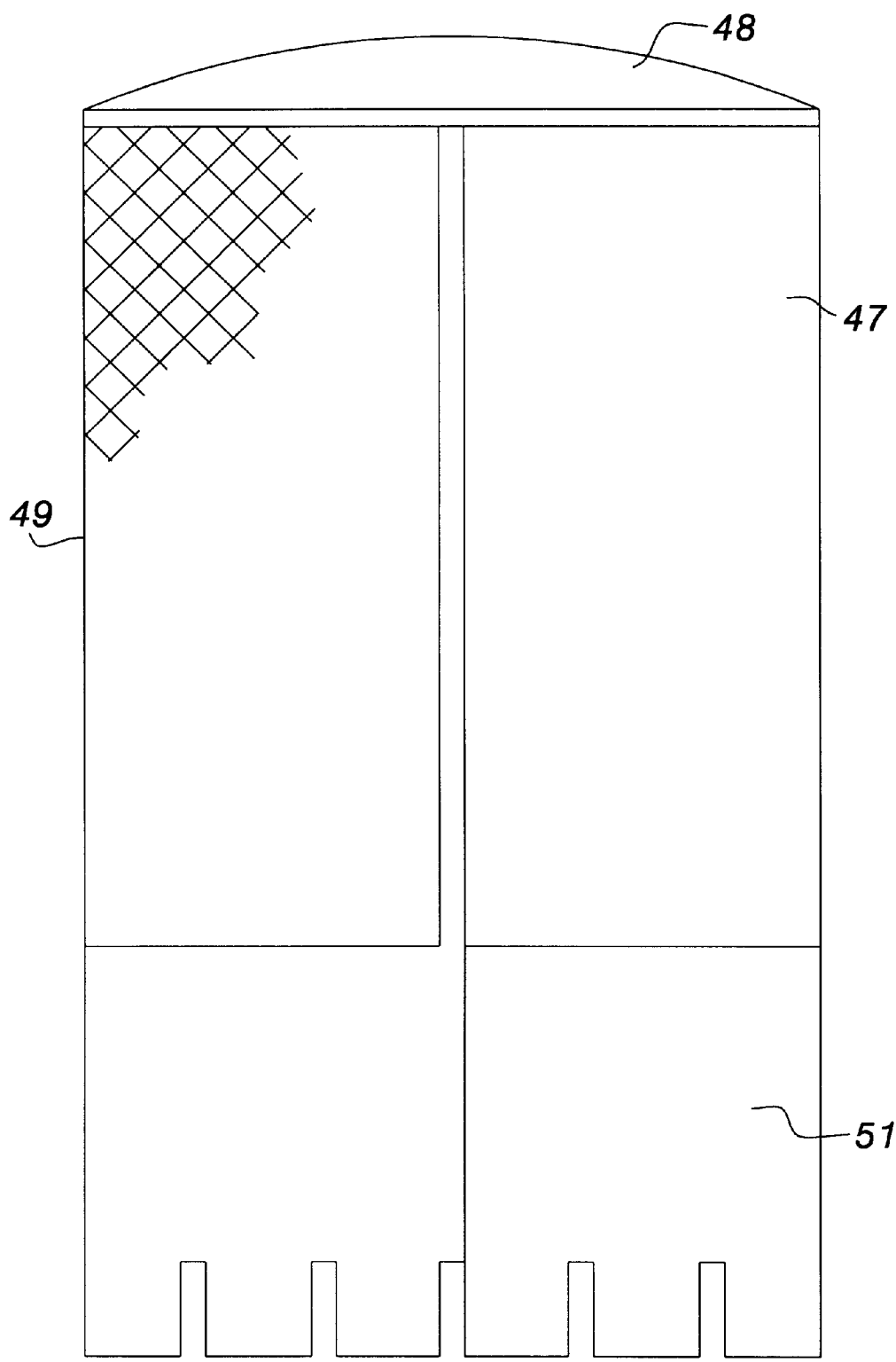
FIG. 7 is a schematic view of a preferred screen suitable for use with a coating according to the invention.
Figure 8:
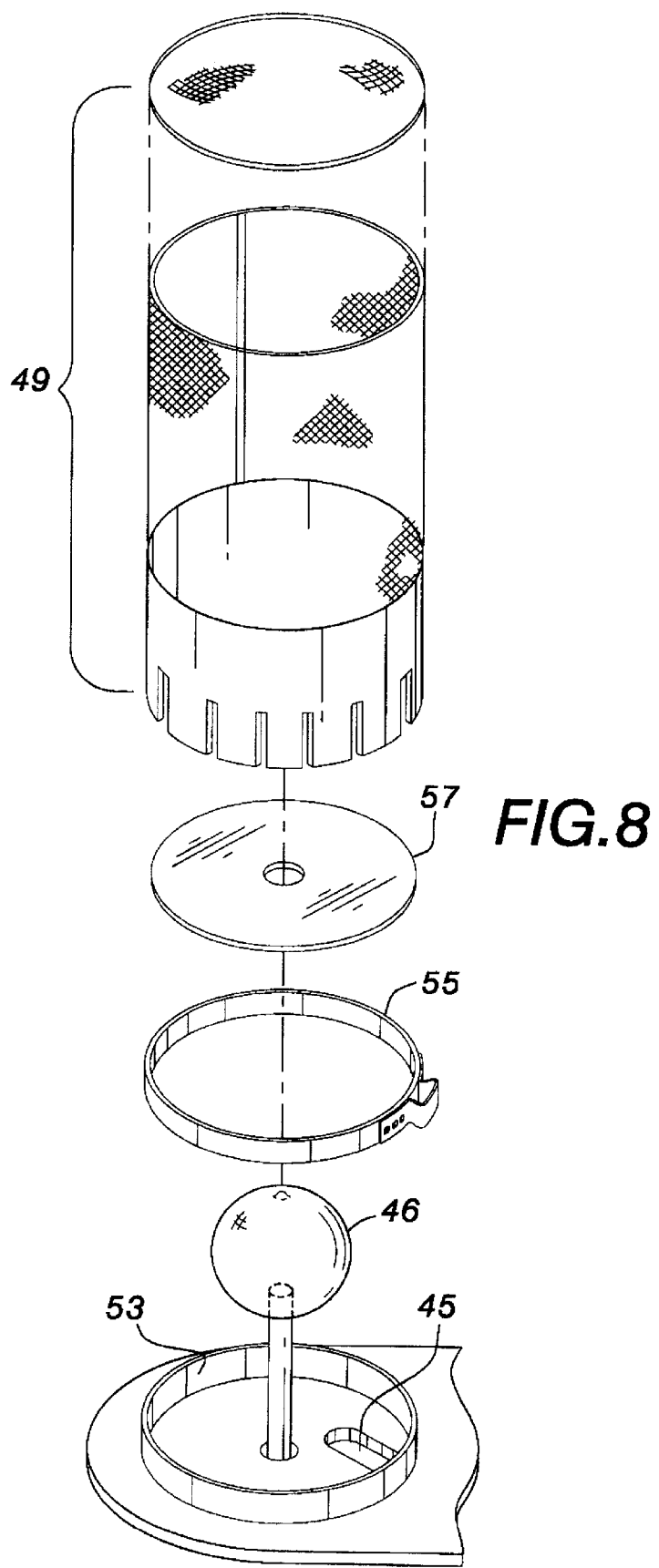
FIG. 8 is an exploded, perspective view a screen assembly.

FIG. 7 shows a preferred screen suitable for a coating according to the invention. A screen unit 49 includes a cylindrical mesh section 47, a mesh end cap 48, and a cylindrical solid section 51. The mesh portions 47 and 48 of the screen 49 are preferably made from silver plating on Nickel flash on stainless steel. FIG. 8 shows a perspective view of a screen assembly which better shows the cylindrical shape the screen 49. After assembly, the screen 49 is fitted around a flange 53 with a bulb 46 and reflector 57 inside the cavity defined by the screen 49. The screen 49 is secured to the flange 53 with a clamp 55. A coupling slot 45 feeds microwave energy to the cavity.

FIG. 9 shows a schematic view of an electrodeless lamp wherein a magnetron 41 generates microwave energy and radiates the energy from an antenna 42. A waveguide 43 directs the microwave energy to the coupling slot 45. The lamp includes a screen 49 with a bulb 46 and a reflector 57 inside the cavity defined by the screen 49. The microwave energy excites a fill in the bulb 46. FIG. 10 shows a schematic view of the electrodeless lamp from FIG. 9 along with an external reflector 44.

From the Solar 1000®, it is clear that a reflective silver plating, with its high electrical conductivity, provides an excellent screen for the microwave cavity in an electrodeless lamp. However, silver may form a black oxide and/or a brown sulfide (tarnish) when exposed to normal atmospheric conditions. Specifically, oxygen and sulfur, or oxygen and sulfur bearing compounds cause silver to tarnish. Moreover, forced cooling of the bulb was eliminated in some versions of the Solar 1000® product, resulting in a great deal of temperature related stress on the screen. For example, temperatures of a new screen were measured to be about 450° C., but the temperature of a tarnished screen could be much higher.

According to the invention, a screen bears a protective coating which does not absorb microwave energy, is transparent or reflective to visible light, and is capable of protecting the screen material under lamp. operating conditions. Preferably the screen is silver plated to provide good conductivity and high reflectivity and, according. to the invention, the screen operates without substantial oxidation or tarnishing for at least several thousand hours at temperatures as high as about 600° C.

Materials which are transparent to visible light and do not appreciably absorb microwaves include, for example, fused silica, crystalline alumina (sapphire), etc. These materials, when applied to a metallic surface, such as a silver plated screen, may fracture when the screen expands due to the different coefficients of expansion. Once the material cracks, oxygen, sulfur, and/or other atmospheric contaminants are. able to penetrate through the surface and begin to oxidize and/or tarnish the metal substrate.

According to the invention, the screen material is coated to protect the screen material from oxidation and/or tarnishing at high screen temperatures and through thermal cycling of the screen, thereby providing an excellent screen with respect to conductivity, reflectivity, and screen life. An important aspect of the present invention is the discovery of various coatings for an electrodeless lamp screen, and processes for applying the coatings, which protect the screen material. The coating remains on the screen at high screen temperatures, and does not significantly crack as the screen heats and cools. Silica is a preferred coating material because it is an excellent barrier to oxygen, and also an excellent barrier to sulfur and other atmospheric contaminants, even at very high temperatures. For example, fused silica is used in high intensity discharge lamp bulbs. Fused silica is also highly transparent and does not absorb microwaves at temperatures below 1000° C. Silver is a preferred screen material because it is one of the best conductors and has the highest reflectivity, in the visible spectrum, of all the metals.

Figure 11:
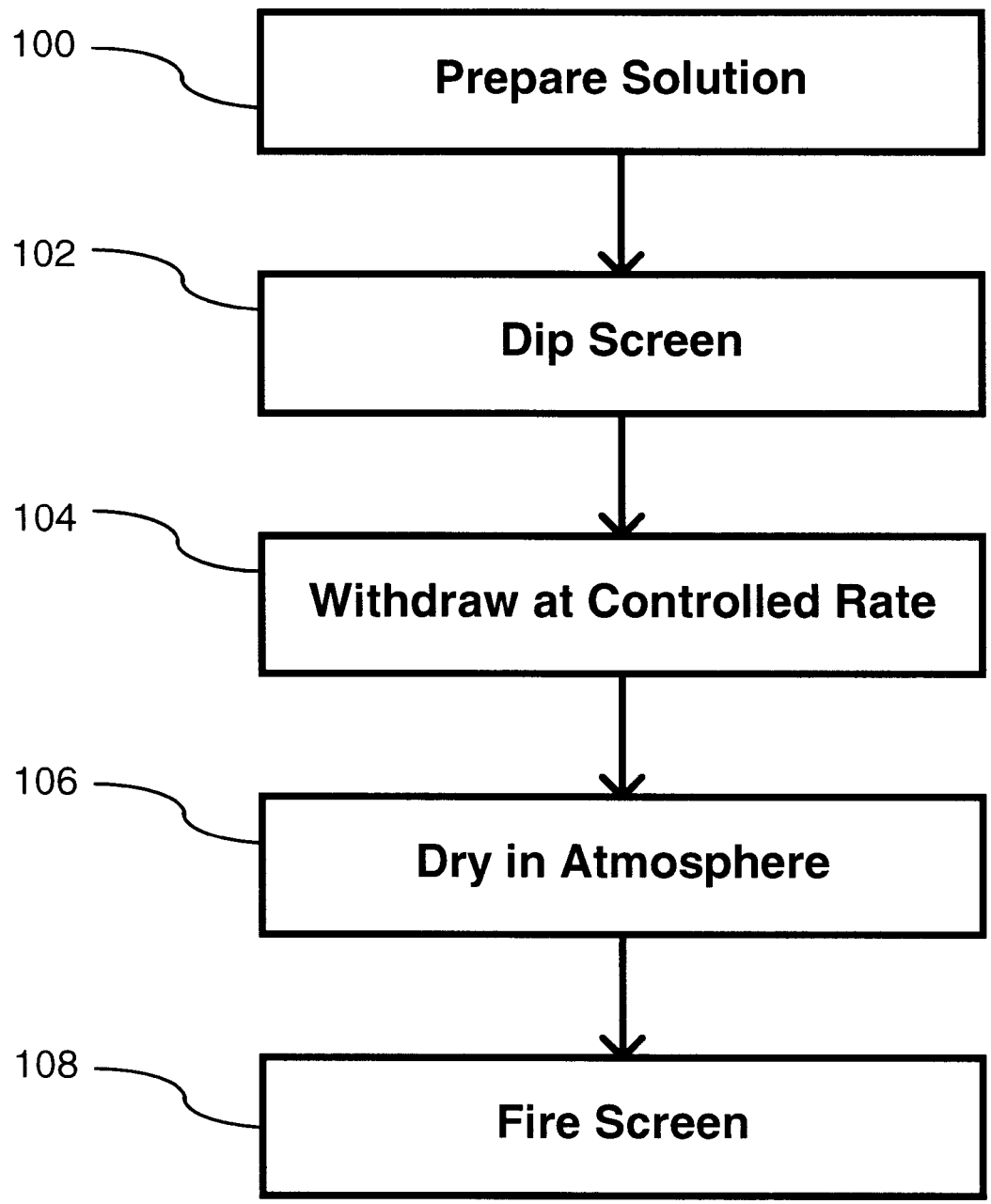
FIG. 11 is a flow diagram of a first process used for coating screens according to the invention.

The sol-gel process for coating the screen is shown generally in FIG. 11. The first step involves preparing the coating solution (Step 100). Next, the screen (e.g. screen 49) is dipped in the solution so that at least the entire mesh portion (e.g. mesh section 47 and mesh end cap 48) are coated with the solution (Step 102). A portion of the metal section 51 may also be coated. Thereafter, the screen is withdrawn from the solution at a uniform rate (Step 104). Next, the screen is allowed to air dry (i.e. in atmosphere) for about 5 to 20 minutes (Step 106). Alternatively, the screen may be baked at about 250° C. in either air or nitrogen to dry the coating. Finally, the screen is fired (e.g. in a furnace) at about 650° C. to 750° C. for at least about 30 minutes and for up to about 3 hours, depending on screen requirements.

The above process may be modified to apply several layers, if desired. For the first layer, steps 100 through 106 would be performed as discussed above. Step 108 would be performed for only about 10 minutes. Subsequent layers would be applied in a like manner (i.e. repeating steps 100 through 106 and performing step 108 for at least about 10 minutes). For the final layer, steps 100 through 106 would be performed as discussed above, and step 108 would be performed for at least about 30 minutes and for up to about 3 hours.

The firing step (Step 108) converts the deposit to a glass, while leaving behind varying amounts of carbonaceous material trapped in the glass matrix. The carbonaceous materials may be, for example, non-glassy by-products of the sol-gel process. Further exposure of the deposit to heat in the presence of oxygen may result in a desired effect, with respect to the coated screens of the present invention, of volatizing the carbonaceous material from the coating, resulting in a more transparent coating.

Figure 12:
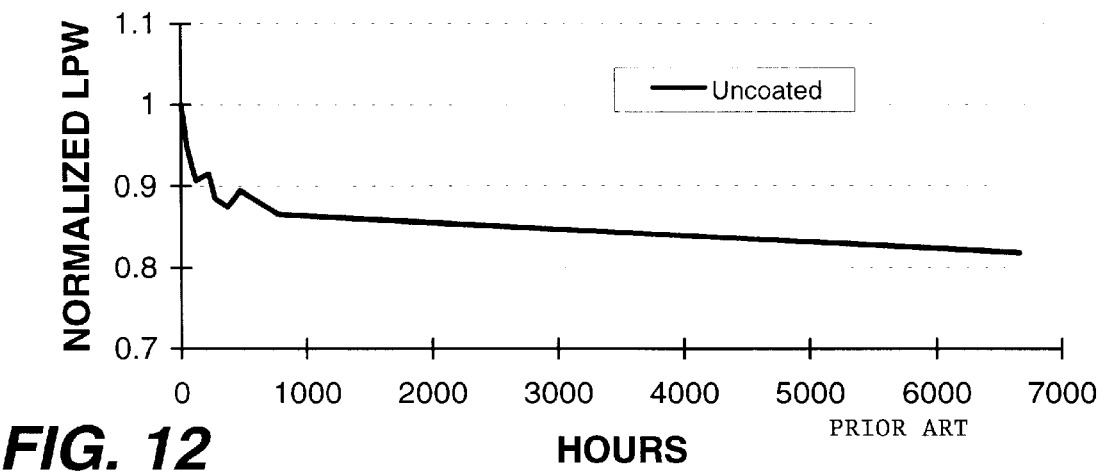
FIG. 12 is a graph of normalized lumens per watt (LPW) versus time for a prior art uncoated screen.

FIG. 12 shows a graph of normalized lumens per watt (LPW) versus hours of operating lamp time for a prior art uncoated screen. It should be noted that the initial light output from an uncoated screen may be greater than that of the coated screens discussed below. However, the light output from the uncoated screen decreases relatively quickly while the light output from the coated screen remains relatively constant. Typically, the absolute light output from an uncoated screen falls below that of a coated screen after between about 200 and 1000 hours of lamp operation, depending on the coating. The graphs in FIGS. 12–14 and 17–25 are normalized such that the peak LPW for each data series is equal to one (1) to emphasize the difference in lumen maintenance rather than the absolute light output.

In each of FIGS. 13–14 and 17–25, the unmarked thin solid line correspond to actual test data for a substantially identical uncoated screen and the dashed thin line represents a projected continuing decrease in light output of 18% over about 7000 hours. Also, in each of FIGS. 13–14 and 16–24, the other plot data corresponds to actual test data for a coated screen.

As can be seen from FIG. 12, the light output from the uncoated screen decreases at a relatively quick rate over about the first 750 hours of lamp operation. This decrease is due to oxidation and/or tarnishing of the screen material. After about 1000 hours of operation the light output decreases at a lower rate. After over 6000 hours of operation, the light output is decreased. by about 18%. Moreover, the overall lamp system output may decrease even more due to deposition of screen material on the reflector.

In each of the following examples, the screen is formed from a Type 303, 304 or similar stainless steel between 0.003 and 0.006. inches thick. The conducting elements are etched to be between 0.003 and 0.006 inches wide and to repeat every 0.08 to 0.1 inch. With the exception of the tenth example, the resulting structure is then plated with nickel flash and 0.0005 to 0.0014 inch electrical grade silver. Exemplary coatings and processes for improving the lifetime performance of the screen are discussed in detail below.

A table of basic chemical supplies used for the sol-gel solution in the following examples is as follows:

| Name of chemical(s) | Symbol / Formula | Purity | Grade |
| --- | --- | --- | --- |
| Methyl alcohol | MeOH / $CH_3OH$ | 99.8+% | American |
| Ethyl alcohol | EtOH / $C_2H_5OH$ | 94% | Chemical |
| 2-Butanone (Methyl ethyl ketone) | MEK / $C_2H_5COCH_3$ | 99% | Society Reagent |
| Phosphoric acid | $H_3PO_4$ | 85 wt % | |
| Nitric acid | $H_3NO_3$ | 70 wt % | |
| Hydrochloric acid | HCl | 70 wt % | |
| Magnesium nitrate | $Mg(NO_3)_2 \cdot 6H_2O$ | 99% | |
| Aluminum nitrate | $Al(NO_3)_3 \cdot 9H_2O$ | 98+% | |
| Tetraethyl orthosilicate | TEOS / $Si(OC_2H_5)_4$ | 98% | n/a |
| Distilled Water | $H_2O$ | 99.9% | n/a |

All of which are commercially available from, for example, the Aldrich Chemical Company, Inc., located in Milwaukee, Wis., USA.\

FIRST EXAMPLE

In a paper entitled "Platinum Substitutes And Two-Phase Glass Overlayers As Low Cost Alternatives To Platinum Aluminide Coatings" (Prasad et al), presented at the International Gas Turbine and Aeroengine Congress & Exhibition in Birmingham, England, Jun. 10–13, 1996, there is a description of a two-phase glass coating to protect titanium turbine blades. The disclosure in that paper is incorporated herein in its entirety. This coating is applied by the well known sol-gel process which is a relatively inexpensive process when compared with various vacuum deposition processes. The two-phase glass coating prevents oxygen attack while resisting. damage. The. coating exhibits the property of self-healing as a result of the two-phase morphology of the glass. The primary phase forms a high melting temperature, diffusion-resistant matrix that blocks oxygen transport to the coated metal. The secondary phase forms small droplets that are dispersed throughout the primary phase matrix. The secondary phase has a relatively low melting point and, consequently, will flow and fill cracks and flaws in the coating. Practical operating temperatures of the two-phase glass coating extend up to approximately 1000° C.

The two-phase morphology is achieved by mixing glass formers having strongly differing field strengths. This leads to unmixing when the coating is first fired. The high melting point of the primary phase renders phase boundary movement difficult, and coalescence of the secondary phase droplets is not expected.

The two-phase glass coating can readily be applied by the sol-gel process. In the sol-gel process, a precursor coating is formed from a metal-organic solution which is gelled on the surface of a given substrate and then fired to form the final coating. The precursors for ceramic oxides are metal alkoxides which are dissolved in alcohol or organic acids. sol-gel coatings can be applied to the substrate by dip coating or spraying.

If the temperature of the screen reaches temperatures where the low glass transition temperature material softens, the two-phase glass material will self heal. If the temperature of the screen does not approach the lower glass transition temperature, then the structural morphology of the material inhibits the growth of cracks due to the dispersion of droplets of material which terminate the growth of cracks.

A preferred process for applying the two phase glass layer is as follows:
1. Prepare the following solution:
   0.96 g magnesium nitrate (3.89% by weight)
   1.88 g aluminum nitrate (7.62% by weight)
   4.05 g MeOH (16.41% by weight)
   6.00 g TEOS (24.31% by weight)
2. Add to the above solution:
   9.85 g MEK (39.91% by weight)
   1.44 g phosphoric acid (5.83% by weight)
   0.50 g MeOH (2.03% by weight)

In the first example, two-phase glass is applied to the screen in alternating layers with $SiO_2$ layers; that is, two layers of two-phase glass, each alternated with a respective layer of $SiO_2$, all applied by the sol-gel process. The total coating thickness is between one and two microns. The sol-gel applied layers are baked at temperatures above 500° C. after each coating.

Figure 13:
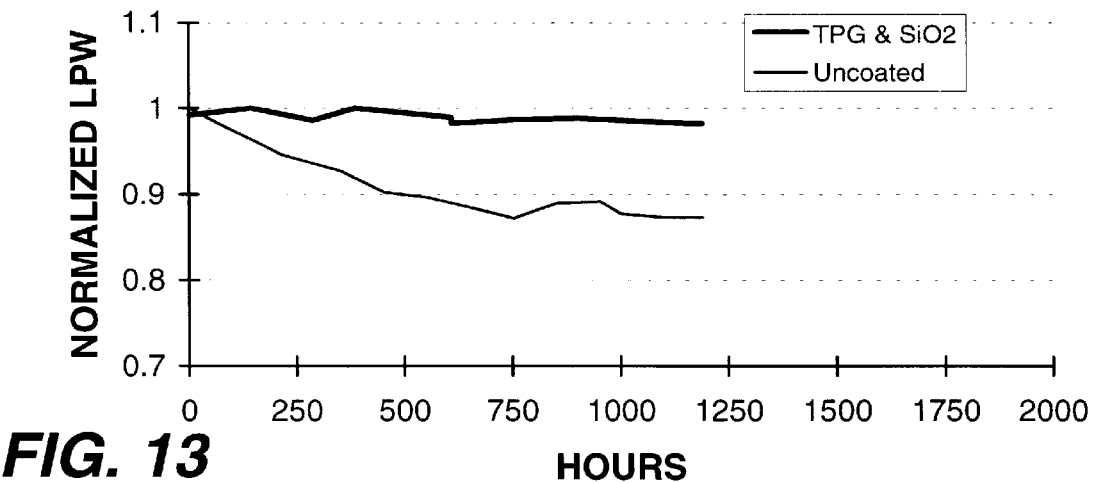
FIG. 13 is a graph of normalized lumens per watt (LPW) versus time comparing an uncoated screen with a screen coated with two-phase glass applied with a three layer process.

FIG. 13 is a graph of normalized LPW versus time comparing the performance of an uncoated screen with a screen coated as described above for the first example. As can be seen from FIG. 13, the light output from the uncoated screen decreases significantly (i.e. >10%) after about 500 hours of operation while the light output from the coated screen decreases only slightly (i.e. <2%) after about 1200 hours of operation.

SECOND EXAMPLE

In the second example, the screen is coated with only a sealant layer of single phase glass. The sealant layer provides sufficient protection for the silver while utilizing a simple one layer process and providing a thin coating. When using only a layer of sealant, the thickness of the layer should be in a range which is not too thin or too thick. Preferably, the coating should be in the range of about 0.5 to 2 microns thick, with about 1 micron thickness being preferred.

It has further been discovered that there is a trade-off between the thickness of the coating and the time required to burn off carbonaceous material, present in the initially applied coating, which makes the coating less transparent.

A process for applying the sealant layer is as follows:
1. Prepare the following solution:
   2.69 g magnesium nitrate (9.14% by weight)
   0.94 g aluminum nitrate (3.20% by weight)
   8.21 g MeOH (27.91% by weight)
   2.83 g TEOS (9.62% by weight)
2. Add to the above solution:
   10.89 g MEK (37.02% by weight)
   2.71 g phosphoric acid (9.21% by weight)
   1.15 g MeOH (3.91% by weight)
3. Dip the screen in the prepared solution.
4. Withdraw the screen at a uniform rate.
5. Dry the screen in room ambient atmosphere for about 5 to 20 minutes.
6. Fire at 700° C.

Figure 14:
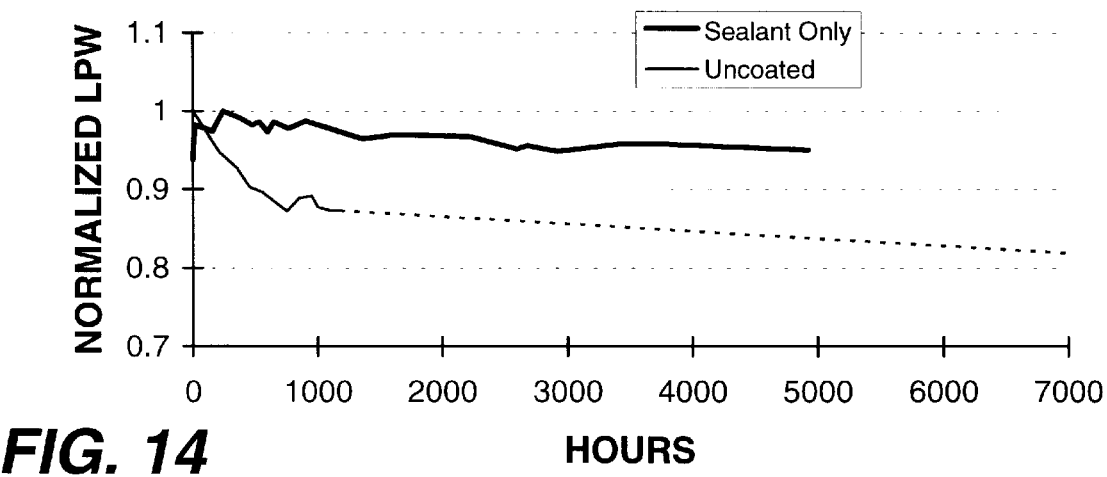
FIG. 14 is a graph of normalized lumens per watt (LPW) versus time comparing an uncoated screen with a screen coated with only a sealant layer using the first process.

FIG. 14 is a graph of normalized LPW versus time comparing the performance of an uncoated screen with a screen coated as described above for the second example. As can be seen from FIG. 14, the light output from the uncoated screen decreases significantly (i.e. >10%) after about 500 hours of operation while the light output from the coated screen initially increases and is actually higher than the initial value after about 5000 hours of operation. As compared to the peak output for the coated screen, the light output decreases a small amount (i.e. <5%) after about 5000 hours of operation.

THIRD EXAMPLE

Figure 15:
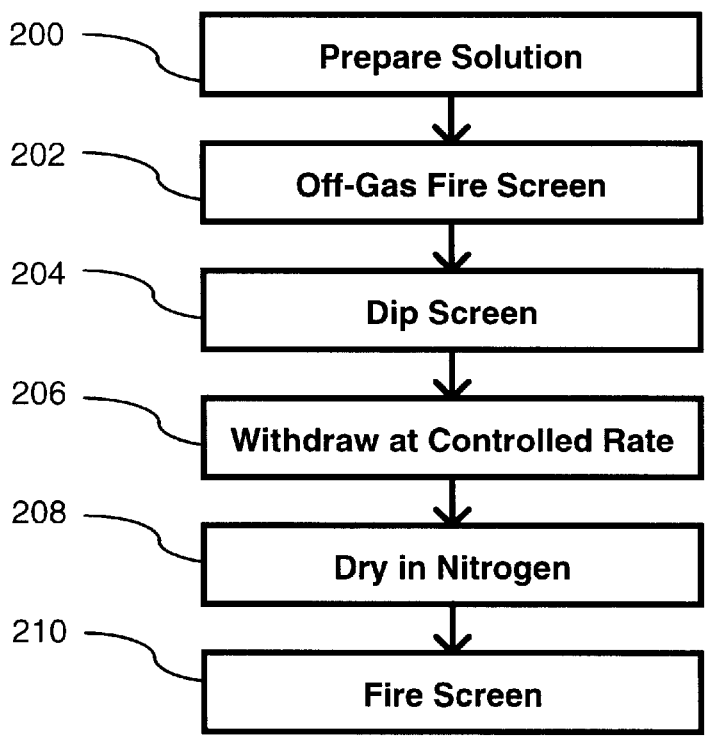
FIG. 15 is a flow diagram of a second process used for coating screens according to the invention.
Figure 16:
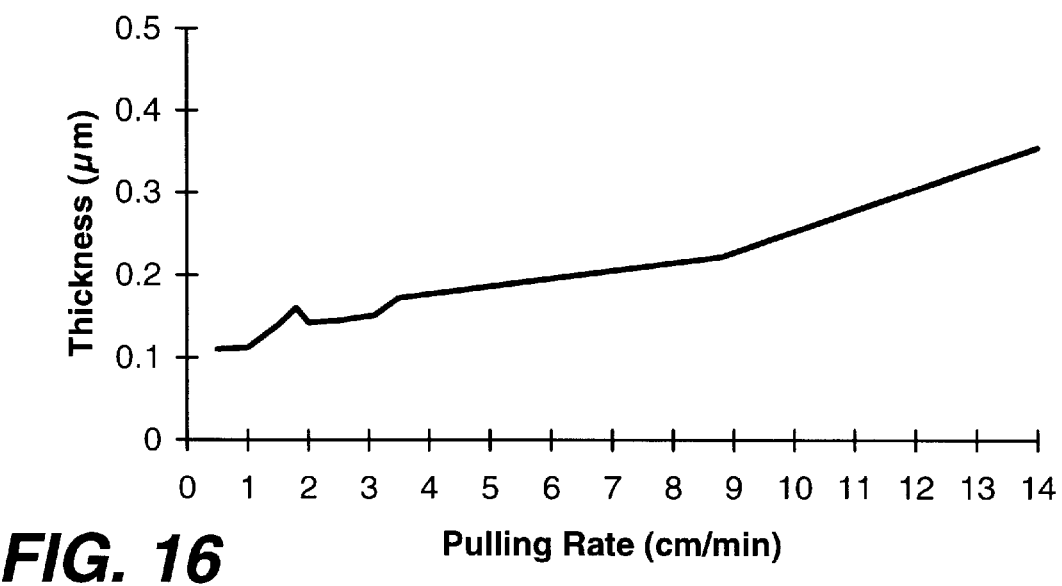
FIG. 16 is a graph of coating thickness versus pulling rate for the coating described in the third example.

FIG. 15 is a flow diagram of a second, preferred process used for coating a screen with a sealant only layer according to the invention. The first step involves preparing the coating solution (Step 200). Next, the screen is off-gas fired (e.g., fired in $N_2$) (Step 202). Then, the screen (e.g. screen 49) is dipped in the solution so that at least the entire mesh portion (e.g. mesh section 47 and mesh end cap 48) are coated with the solution (Step 204). A portion or all of the metal section 51 may also be coated. Thereafter, the screen is withdrawn from the solution at a uniform rate (Step 206). Next, the screen is dried in $N_2$ for at least about 30 minutes (Step 208). Finally, the screen is fired (Step 210) as described below.

Coating Thickness

The coating thickness depends on the pulling rate. Thin silver foils with the same configuration and size were dipped into the above described sol-gel solution and pulled out with different pulling rates ranging from about 0.5 cm/min to about 14 cm/min. The weight of the foils was measured before dipping and after firing, respectively. The weight difference between the two measurements was used to calculate the thickness of the coating layer based on the assumptions that thickness is uniform and density of the coating layer is known. The results are plotted in FIG. 16. From these results, it is estimated that the thickness of the coating layer should be about 0.1 to about 0.15 μm at a pulling rate of three (3) cm/min.

Preferably, prior to coating, all glassware and apparatus used in the coating process are thoroughly cleaned to avoid contamination. Of course, those skilled in the art-will appreciate that safety precautions must be taken when dealing with the chemicals and heat involved in the sol-gel process. A preferred process for preparing a sol-gel solution in the third example is as follows:

1. Prepare the following solution:
   Part A:
   210.5 g magnesium nitrate (15.36% by weight)
   75 g aluminum nitrate (5.47% by weight)
   373 g MeOH (27.18% by weight) mixed until clear, then add slowly:
   108 g TEOS (7.91% by weight) continue mixing until clear.
2. Prepare the following solution:
   Part B:
   484.9 g MEK (35.37% by weight)
   67.24 g phosphoric acid (4.90% by weight)
   52.21 g MeOH (3.81% by weight)
3. Slowly, while mixing, add Part B to Part A. Continue mixing until solution is clear.

A preferred process for applying the sealant layer in the third example is as follows:
   1) Prepare the sol-gel solution as described above
   2) Off-gas fire the screen at about 750° C. in $N_2$ for 30 minutes
   3) Dip the screen
   4) Withdraw the screen at an about 3 cm/min pulling rate
   5) Dry screen at about 230° C. in $N_2$ for more than 30 minutes
   6) Fire screen with standard firing procedure as described below A preferred firing process in the third example is as follows:
   1) Heat furnace to 500° C. and purge furnace with $N_2$ for more than 20 minutes before loading screen
   2) Heat furnace from 500° C. to 600° C. at 5° C./min
   3) Hold furnace at 600° C. for 20 minutes,
   4) Heat furnace from 600° C. to 750° C. at 5° C./min
   5) Hold furnace at 750° C. for 30 minutes, turn off $N_2$
   6) Hold furnace at 750° C. in air for 150 minutes
   7) Cool furnace to below 500° C. and remove screen.

Figure 17:
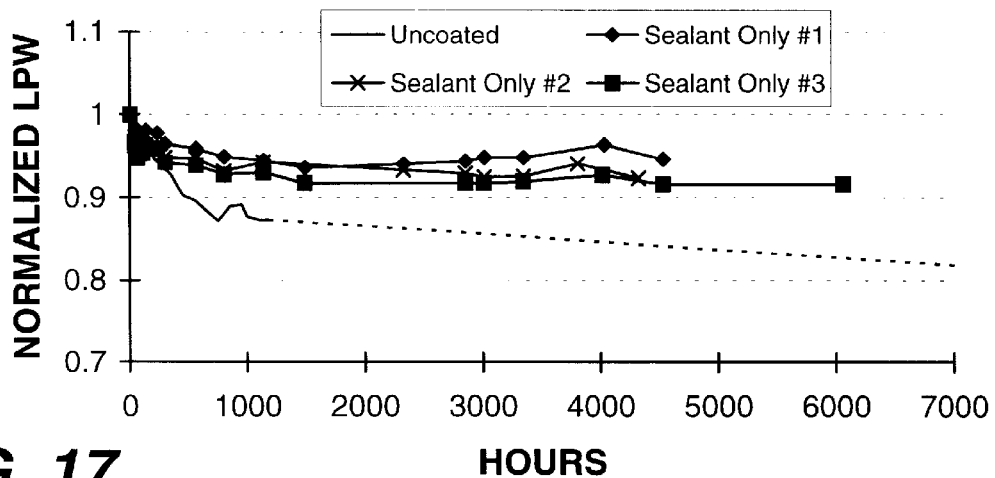
FIG. 17 is a graph of normalized lumens per watt (LPW) versus time comparing an uncoated screen with three screens coated with only a sealant layer using the second process.

FIG. 17 is a graph of normalized lumens per watt (LPW) versus time comparing an uncoated screen with three screens coated with only a sealant layer using the second process. As can be seen in FIG. 17, the light output from the coated screens stabilizes after about 1500 hours and thereafter remains substantially constant over about 5000–6000 hours.

Screen and Coating Color

According to the invention, the firing procedure is controlled to produce a desired screen/coating color. The above-described process produces a screen/coating color which has a yellow tint. This is the case with or without an off-gas firing pre-treatment procedure. Replacing the above-described firing procedure with a fast firing procedure, in which the screen is heated in $N_2$ at 750° C. for 30 minutes and then removed from the furnace, produces a screen color which has a white tint. The fast fired screen has a higher initial LPW than the screens with a yellow tint, due to the higher reflectance of the white color. Even better LPW results are obtained from screens which are first coated and fired as described above, and then further fired at 750° C. in $N_2$ for 60 minutes to produce a white screen / coating color.

It is observed from lamp tests that a sol-gel coated screen may change its color from the above mentioned yellow or white color to reddish/brown after running the screen in a reflector covered lamp for 10 minutes. Similar color change also occurred for a newly coated screen held in a furnace at 450° C. for 15 minutes. The LPW decreases as the screen color changes because the reflectance of the reddish/brown color is low. However, the color change process is reversible. By reheating the reddish screen up to 500° C. to 700° C. in air or $N_2$, the original yellow or white color may be recovered. Also, if forced air cooling or other cooling :s provided during lamp operation to keep the screen temperature below about 400° C., the color is expected to remain stable longer.

Organic Residuals in a Coated Screen

A number of organic solvents are used in the standard sol-gel solution. If the firing process does not sufficiently clean out the organic substance from the coating layer, the residual organic in the coating layer may evaporate out and contaminate the lamp reflector later on when the lamp is running. A Thermogravimetric analysis (TGA) test was performed to quantitatively measure the amount of organic residuals in the coating of the third example. A specimen was heated from 30° C. to 400° C. at a rate of 10° C./minute, in a dry air atmosphere with 20 milliliter/minute air flow. The specimen was then held at 400° C. for 30 minute. The measured weight loss after 67 minutes total is only 0.04%.

FOURTH EXAMPLE

In the fourth example, a screen is coated with one layer of TPG as described above with respect to the first example and then coated with one layer of sealant as described above with respect to the third example.

Figure 18:
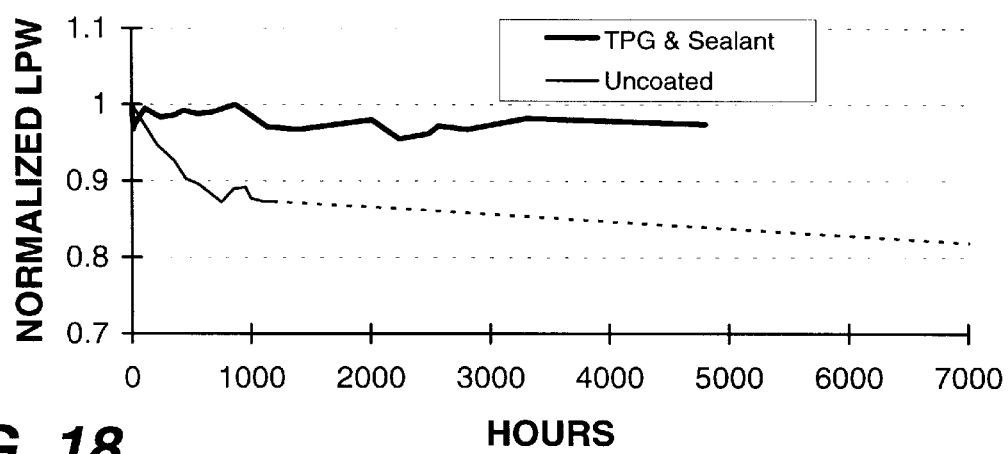
FIG. 18 is a graph of normalized lumens per watt (LPW) versus time comparing an uncoated screen with a screen coated with two-phase glass with alternating sealant layers.

FIG. 18 is a graph of normalized LPW versus time comparing the performance of an uncoated screen with a screen coated as described above for the fourth example. As can be seen from FIG. 18, the light output from the uncoated screen decreases significantly (i.e. >10%) after about 500 hours of operation while the light output from the coated screen initially increases and, as compared to the peak output, the light output decreases a small amount (i.e. <3%) after about 4800 hours of operation.

FIFTH EXAMPLE

The fifth example is identical to the first example, except instead of alternating the two-phase glass layers with $SiO_2$ layers, the two phase glass layers are alternated with a sealant layer applied as described above with respect to the third example.

Figure 19:
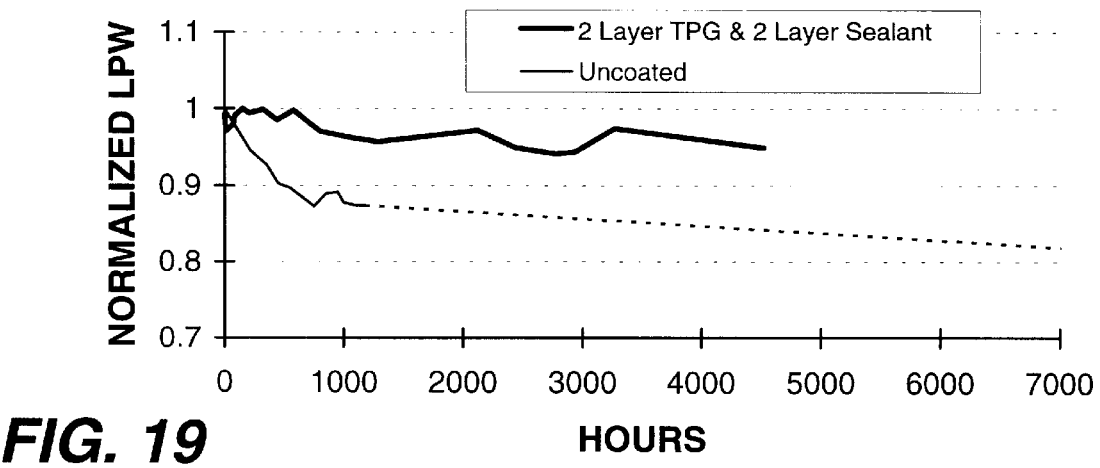
FIG. 19 is a graph of normalized lumens per watt (LPW) versus time comparing an uncoated screen with a screen coated with two layers of two-phase glass and two layers of sealant.

FIG. 19 is a graph of normalized LPW versus time comparing the performance of an uncoated screen with a screen coated as described above for the fifth example. As can be seen from FIG. 19, the light output from the uncoated screen decreases significantly (i.e. >10%) after about 500 hours of operation while the light output from the coated screen initially increases and, as compared to the peak output, the light output decreases a small amount (i.e. <about 5%) after about 4500 hours of operation.

SIXTH EXAMPLE

Prior to dipping the screen in the sol-gel solution, the screen may, as a pre-treating step, be dipped in a solution of glycidoxy propyl trimethoxy silane (GPS) in isopropyl alcohol, and then dried. Thereafter, the screen is put through the sol-gel process as described above with respect to the fourth example. The pre-treating step provides protection for the silver from the catalyst (e.g. phosphoric or nitric acid) in the sol-gel process, thereby preserving reflectivity. The preferred pre-treating solution is 1.07 g (1.38% by weight) GPS in 77.7 g (98.62% by weight) isopropyl alcohol.

Figure 20:
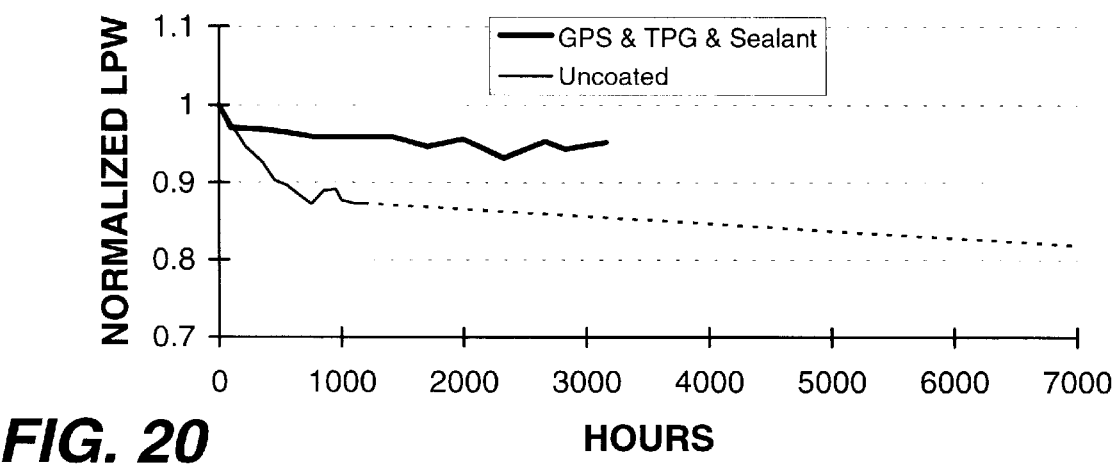
FIG. 20 is a graph of normalized lumens per watt (LPW) versus time comparing an uncoated screen with a screen pre-treated in a solution of glycidoxy propyl trimethoxy silane and then coated with two-phase glass with alternating sealant layers.

FIG. 20 is a graph of normalized LPW versus time comparing the performance of an uncoated screen with a screen coated as described above for the sixth example. As can be seen from FIG. 20, the light output from the uncoated screen decreases significantly (i.e. >10%) after about 500 hours of operation while the light output from the coated screen initially increases and, as compared to the peak output for the coated screen, the light output decreases a small amount (i.e. <about 5%) after about 4500 hours of operation.

An alternative pre-treatment step is to apply a thin (e.g. 0.01 to 0.02 micron) coating of $SiO_2$ via physical vapor deposition (PVD) to the screen prior to dipping in the sol-gel solution. Because the pre-treatment coating is extremely thin, it may be deposited in a cost-effective manner. However, the pre-treatment coating is thick enough to provide protection for the silver from the catalyst during the brief exposure in the sol-gel process.

SEVENTH EXAMPLE

Many solutions for sol-gel processes contain phosphoric acid. The phosphoric acid acts as a catalyst for the sol-gel process. However, the phosphoric acid may attack and darken silver.

According to another aspect of the invention, a nitric acid is substituted at equal molar volumes for the phosphoric acid as the catalyst in the sol-gel process. Nitric acid attacks and darkens silver to a lesser degree than phosphoric acid. Therefore, the silver retains a greater degree of reflectivity through the sol-gel process.

The. preferred process for the seventh example is identical to the third example, except that 102 g nitric acid ($HNO_3$ (70%); 7.28% by weight; 103 ml; density 1.42) is substituted for the 67.24 g phosphoric acid.

Figure 21:
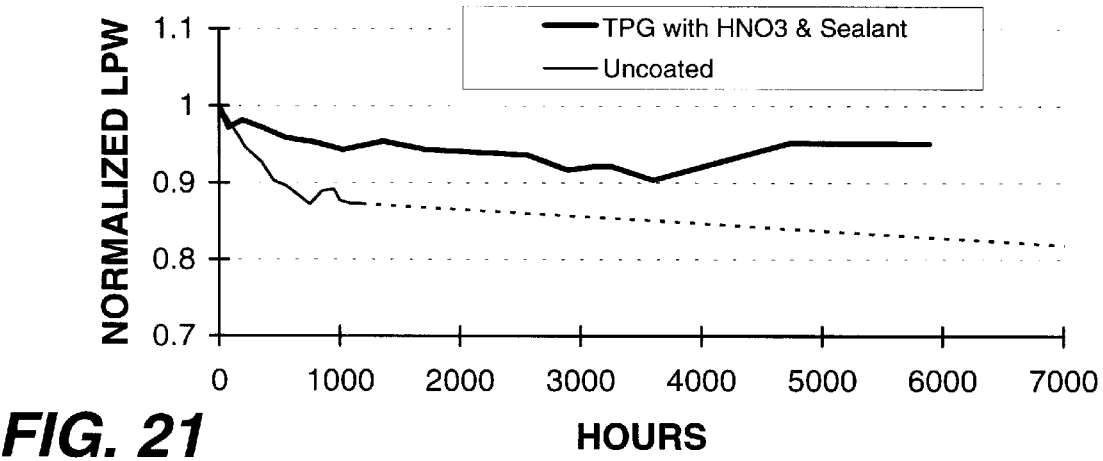
FIG. 21 is a graph of normalized lumens per watt (LPW) versus time comparing an uncoated screen with a screen coated with two-phase glass with alternating sealant layers, where nitric acid is substituted at equal molar volumes for the phosphoric acid as the catalyst in the sol-gel process.

FIG. 21 is a graph of normalized LPW versus time comparing the performance of an uncoated screen with a screen coated as described. above for the seventh example. As can be seen from FIG. 21, the light output from the uncoated screen decreases significantly (i.e. >10%) after about 500 hours of operation while the light output from the coated screen gradually decreases over the first about 3500 hours and then increases to within about 5% of the peak output for the coated screen after about 5900 hours of operation.

EIGHTH EXAMPLE

In the eighth example, two sealant layers are applied as described above with respect to the third example.

Figure 22:
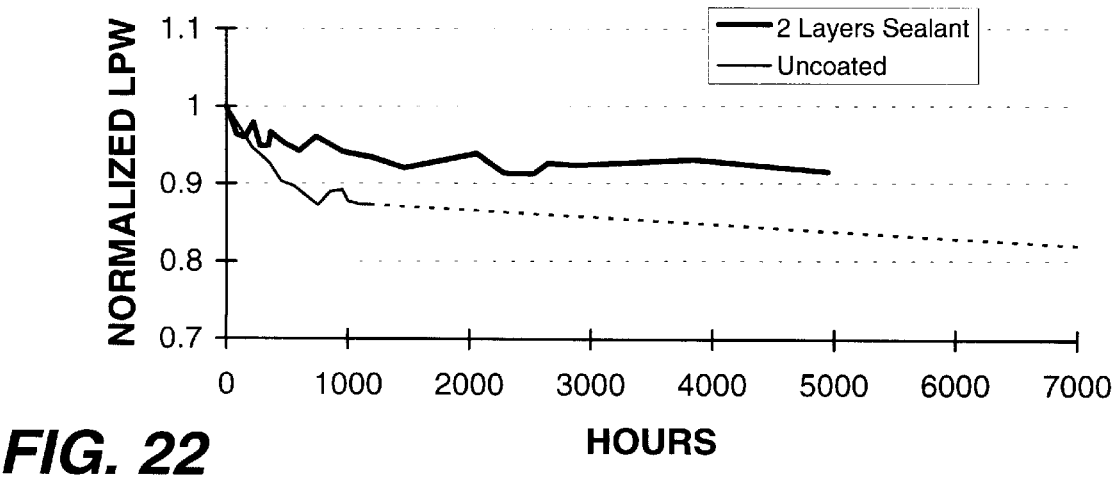
FIG. 22 is a graph of normalized lumens per watt (LPW) versus time comparing an uncoated screen with a screen coated with two sealant layers.

FIG. 22 is a graph of normalized LPW versus time comparing the performance of an uncoated screen with a screen coated as described above for the eighth example. As can be seen from FIG. 22, the light output from the uncoated screen decreases significantly (i.e. >10%) after about 500 hours of operation while the light output from the coated screen gradually decreases over about 5000 hours of operation.

NINTH EXAMPLE

Figure 23:
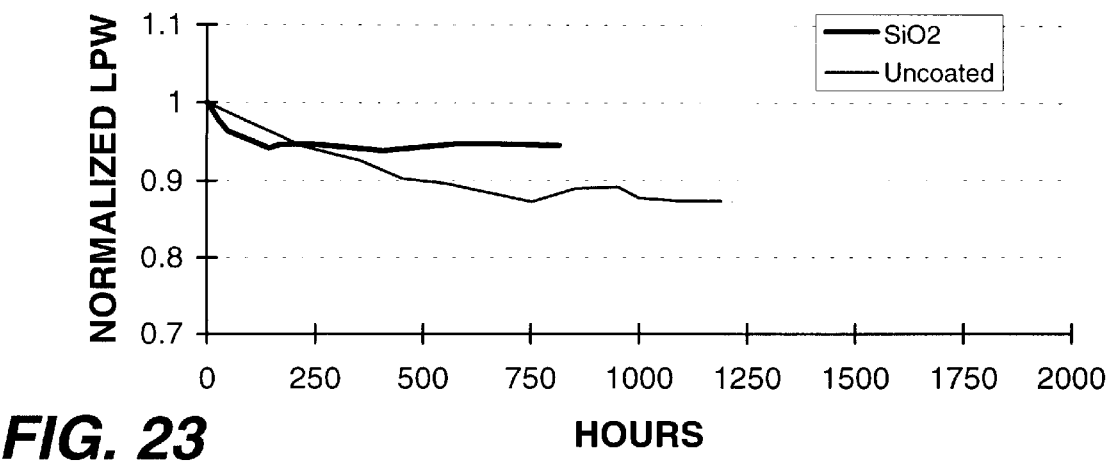
FIG. 23 is a graph of normalized lumens per watt (LPW) versus time comparing an uncoated screen with a screen coated with only a sealant layer using a pure $SiO_2$ sol-gel solution.

The sol-gel process is a suitable method for applying a thin coating of $SiO_2$ to a screen. A preferred process is as follows:

1) Prepare the following solution:
   25 g EtOH (38.40% by weight)
   37.6 g TEOS (57.76% by weight)
   0.3 g HCl (0.46% by weight)
   2.2 g $H_2O$ (3.38% by weight)
2) Dip screen
3) Withdraw screen at a uniform rate of about 3 cm/min
4) Dry screen at about 230° C. in $N_2$ for more than 30 minutes
5) Fire screen at about 500° C. in $N_2$ for 60 minutes
6) Fire screen at about 750° C. in air for 60 minutes FIG. 23 is a graph of normalized LPW versus time comparing the performance of an uncoated screen with a screen coated as described. above for the ninth example. As can be seen from FIG. 23, the light output from the uncoated screen decreases significantly (i.e. >10%) after about 500 hours of operation while the light output from the coated screen levels out within the first about 200 hours and then remains substantially constant within about 6% of the peak output for the coated screen after over 750 hours of operation.

In the coated screen according to the ninth example, little change in color has been observed after over 750 hours of operation. A small amount of micro-cracks have been observed in the $SiO_2$ coated screen, but the effect on protecting the screen from oxidation and/or tarnishing is negligible thus far.

TENTH EXAMPLE

Although most of the coatings described herein are applied through a sol-gel process, other processes and coatings may be used so long as they provide protection for the screen material. In the tenth example, the screen is stainless steel and is not silver plated, although a silver plated screen may alternatively be used. A ceramic coating material, known by the trade name Thurmalox 280 Alum, is applied to the screen. This material is available, for example, from the Dampney Company, Inc. of Everett, Mass., USA.

The Thurmalox 280 Alum coating material is a silica base with very fine aluminum in suspension. The screen is dipped in the coating material and then withdrawn and shaken to make the coating smooth.

Figure 24:
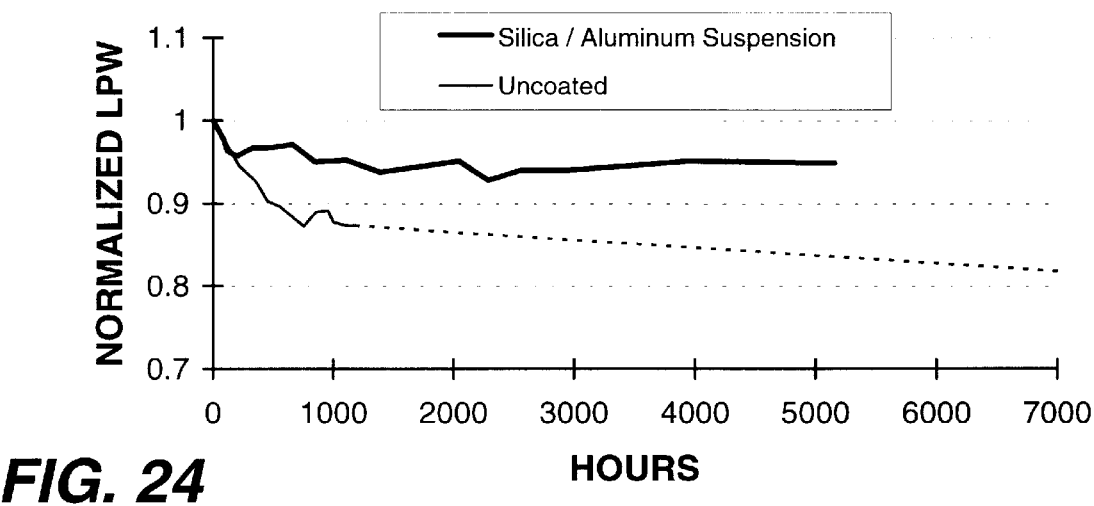
FIG. 24 is a graph of normalized lumens per watt (LPW) versus time comparing an uncoated screen with a screen coated with a sealant layer using aluminum particles suspended in a base of silicone.

FIG. 24 is a graph of normalized LPW versus time comparing the performance of an uncoated screen with a screen coated as described above for the tenth example. As can be seen from FIG. 24, the light output from the uncoated screen decreases significantly (i.e. >10%) after about 500 hours of operation while the light output from the coated screen levels out within the first about 2500 hours and then remains substantially constant within about 5–6% of the peak output for the coated screen after over 5000 hours of operation.

ELEVENTH EXAMPLE

Another coating process which does not utilize the sol-gel process is ion beam assisted physical vapor deposition (PVD) of silicon dioxide. Silicon dioxide ($SiO_2$) can be vapor deposited by means of electron beam deposition onto glass or fused silica substrates. It is commonly used as one of several layers in dichroic coatings which are employed as reflectors or anti-reflection coatings. As long as silicon dioxide is put down on a substrate which matches its coefficient of expansion, it is relatively stable. If, however, put down on a metallic surface, particularly a metallic surface that is subject to high temperatures, SiO2 may crack due to built up stresses. Thus, simply applying $SiO_2$ to a silver plated screen would not protect the screen if the application is too thick because the silicon dioxide surface cracks and oxygen may penetrate and attack the underlying silver.

According to the invention, a thin layer of silicon dioxide is deposited on a screen. Two screens were coated with different thicknesses of silicon dioxide. The first screen was coated using a conventional PVD process which would provide a nominal thickness of 200 nm on a flat substrate. The first screen was coated at angle of about 45 degrees and rotated through the beam with a duty cycle of about 50% to provide an estimated thickness of 50 to 100 nm of the silicon dioxide coating. The second screen was coated using a conventional PVD process which would provide a nominal thickness of 400 nm on a flat substrate. The second screen was also coated at angle of about 45 degrees and rotated through the beam with a duty cycle of about 50% to provide an estimated thickness of 100 to 200 nm of the silicon dioxide coating.

Figure 25:
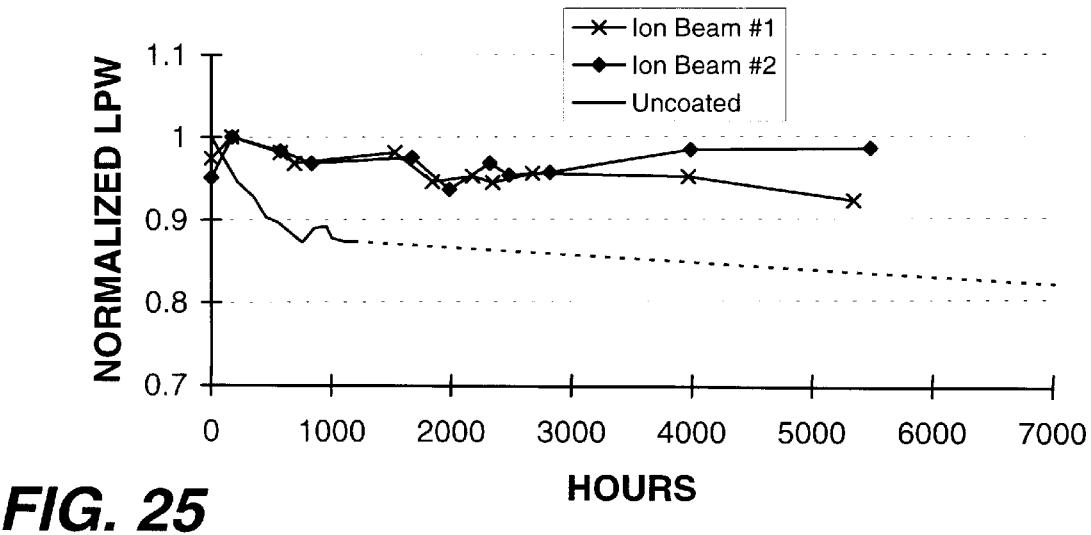
FIG. 25 is a graph of normalized lumens per watt (LPW) versus time comparing an uncoated screen with a screen coated with a layer of $SiO_2$ applied by ion beam deposition.

FIG. 25 is a graph of normalized LPW versus time comparing the performance of an uncoated screen with the two screens coated as described above for the eleventh example. As can be seen from FIG. 25, the light output from the uncoated screen decreases significantly (i.e. >10%) after about 500 hours of operation while the light output from the coated screen initially increases, then decreases gradually, and then remains substantially constant within about 2% of the peak output for the first screen (Ion Beam #1) and within about 8% of the peak output for the second screen (Ion Beam #2) after over 5000 hours of operation.

While the invention has been disclosed with respect to specific examples, the improvements described herein are not limited to the examples disclosed and are applicable to other screen materials and configuration. For example, screens plated with other materials such as stainless steel, nickel, copper, or other materials which oxidize and/or tarnish when exposed to the atmosphere would benefit from the coatings and processes for applying the coatings described herein. The coatings and processes for applying the coating according to the invention may also applicable for preserving the reflectivity of a reflector in an electrodeless lamp. Moreover, while the above processes have been described with respect to coating a single screen, many screens may be coated at one time with appropriate machinery and fixtures.

What is claimed is:

1. A screen for a discharge lamp, said screen comprising a conductive mesh bearing a protective coating for inhibiting degradation of the screen, wherein said degradation comprises at least one of oxidation and tarnishing and wherein the protective coating comprises a diffusion barrier, and wherein said diffusion barrier is effective to inhibit said at least one of oxidation and tarnishing at a screen temperature of greater than about 300° C.

2. The screen as recited in claim 1, wherein said diffusion barrier comprises silica.

3. The screen as recited in claim 1, wherein said diffusion barrier comprises single phase glass.

4. The screen as recited in claim 1, wherein said diffusion barrier comprises two phase glass.

5. The screen as recited in claim 1, wherein said diffusion barrier comprises alternating layers of two phase glass and silicon dioxide.

6. The screen as recited in claim 1, wherein said diffusion barrier comprises alternating layers of two phase glass and single phase glass.

7. the screen as recited in claim 1, wherein said diffusion barrier comprises silicon dioxide.

8. The screen as recited in claim 1, wherein said diffusion barrier comprises silica and aluminum.

9. The screen as recited claim 2, wherein said diffusion barrier does not substantially crack at a screen temperature of greater than about 300° C.

10. A screen for an electrodeless discharge lamp, said screen bearing a coating which substantially reduces the diffusion of at least one of oxygen and sulfur onto the screen, wherein said coating is effective to substantially reduce said diffusion of said at least one of oxygen and sulfur at a screen temperature of greater than about 300° C.

11. The screen as recited in claim 10, wherein the coating also substantially reduces the sublimation of the screen material.

12. The screen as recited in claim 10, wherein the coating is substantially transparent to light.

13. The screen as recited in claim 10, wherein the coating is diffusely reflective.

14. The screen as recited in claim 10, wherein the coating is specularly reflective.

15. The screen as recited in claim 10, wherein the coating comprises a glass coating with a set of material properties which provide said substantial reduction in diffusion without substantial cracking as the screen heats and cools.

16. The screen as recited in claim 10, wherein said coating does not substantially crack at a screen temperature of greater than about 300° C.

17. An electrodeless, microwave discharge lamp, comprising
a magnetron for generating microwave energy;
a waveguide coupled to the magnetron for directing the microwave energy to a coupling slot;
a screen defining a microwave cavity, the screen surrounding the coupling; and
an envelope containing a plasma forming discharge, the envelope being disposed within the cavity defined by the screen,
wherein the screen bears a protective coating which does not absorb microwave energy, is transparent or reflective to visible light, and is capable of protecting the screen material under lamp operating conditions including a screen temperature of greater than about 300° C.

18. The electrodeless, microwave discharge lamp as recited in claim 17, wherein the lamp is capable of operating for at least about 1000 hours without substantial oxidation or tarnishing of the screen.

19. The electrodeless, microwave discharge lamp as recited in claim 18, wherein the coating remains on the screen at screen temperatures above about 300° C., and wherein the coating does not significantly crack as the screen heats and cools.

20. A method of protecting a screen for a discharge lamp, comprising the step of coating the screen with a material which inhibits degradation of the screen, wherein the coating step comprises coating the screen with a diffusion barrier which is effective to inhibit at least one of oxidation and tarnishing at a screen temperature of greater than about 300° C.

21. The method as recited in claim 20, wherein the coating step comprises coating the screen with a diffusion barrier which inhibits said at least one of oxidation and tarnishing of the screen.

22. The method as recited in claim 20, wherein the coating step comprises coating the screen with a silica containing material.

23. The method as recited in claim 20, wherein the coating step comprises coating the screen with a single phase glass.

24. The method as recited in claim 20, wherein the coating step comprises coating the screen with a two phase glass.

25. The method as recited in claim 20, wherein the coating step comprises coating the screen with alternating layers of two phase glass and silicon dioxide.

26. The method as recited in claim 20, wherein the coating step comprises coating the screen with alternating layers of two phase glass and single phase glass.

27. The method as recited in claim 20, wherein the coating step comprises coating the screen with silicon dioxide.

28. The method as recited in claim 20, wherein the coating step comprises coating the screen with silica and aluminum.

29. The method as recited in claim 20, wherein the coating step comprises coating the screen with a diffusion barrier which does not substantially crack at a screen temperature of greater than about 300° C.

* * * * *